United States Patent [19]

Orthoefer

[11] 4,200,551
[45] Apr. 29, 1980

[54] COLD-WATER-DISPERSIBLE LECITHIN CONCENTRATES

[75] Inventor: Frank T. Orthoefer, Decatur, Ill.

[73] Assignee: A. E. Staley Manufacturing Company, Decatur, Ill.

[21] Appl. No.: 964,102

[22] Filed: Nov. 27, 1978

[51] Int. Cl.$^2$ .................... B01J 13/00; B01F 17/30
[52] U.S. Cl. .................... 252/312; 252/356; 260/403
[58] Field of Search .............. 260/403; 252/312, 356

[56] References Cited

U.S. PATENT DOCUMENTS

| | | | |
|---|---|---|---|
| 3,208,857 | 9/1965 | Howard et al. | 260/403 |
| 3,232,765 | 2/1966 | Rosenthal et al. | 252/312 |
| 3,360,378 | 12/1967 | Spitzer | 426/604 |
| 3,560,225 | 2/1971 | Wonsiewicz | 426/660 |

*Primary Examiner*—John F. Niebling
*Attorney, Agent, or Firm*—M. Paul Hendrickson; Charles J. Meyerson

[57] ABSTRACT

Cold-water-dispersible lecithin concentrates are prepared by a homogeneous blend of lecithin and certain nonionic emulsifiers (e.g., polyoxyethylene mono- and diglycerides and polyoxyethylene derivatives of partial fatty acid esters and hexitol anhydrides). The concentrates readily disperse into cold water (e.g., under 5° C.) over a broad concentration range (e.g., 0.05–30%) to form low-viscosity and stable lecithin in water emulsions. Concentrates containing polyoxyethylene mono- and/or diglycerides are particularly effective emulsifiers for the lecithin concentrate.

18 Claims, No Drawings

COLD-WATER-DISPERSIBLE LECITHIN CONCENTRATES

BACKGROUND OF THE INVENTION

In the refining of crude vegetable oils, it is conventional to remove phosphatides (frequently referred to as lecithin) from the oil. This process is commonly referred to as "degumming". Degumming is typically achieved by hydrating the lecithin-containing crude oil and recovering the insoluble hydrated lecithin (frequently referred to as wet gum) from the oil. A commercial lecithin product is then obtained by drying the wet gum. Such commercial lecithin products generally have an acetone insoluble (A.I) of at least 50 and are most typically within about the 60 to about 65 A.I. range.

Certain chemical reagents such as acid anhydrides may be added, in small amounts, to crude vegetable oil to facilitate the wet gum separation and to improve upon the purity and quality of the degummed oil. The degree of ethylenic unsaturation, as reflected by its iodine value (I.V.), is not appreciably altered by the addition of a small amount of acid anhydride.

Commercial lecithins characteristically possess relatively poor hydrophilic properties. The lecithin products wet poorly and non-uniformly when dispersed into water. The unmodified lecithin products generally require a high shear and elevated temperatures (e.g., 120° F.) to uniformly disperse into water and form stable emulsions. These undesirable attributes severely limit their utility for oil-in-water type applications.

The art has sought to overcome these hydrophilic shortcomings by numerous different approaches. One approach has been to chemically or enzymatically modify ordinary lecithin to improve upon its hydrophilicity. Another approach has been to remove the antagonistic components thereof. A still further approach has been to incorporate or use other compensatory additives to improve upon its water-dispersibility.

Most chemical derivitization processes, which reportedly improve upon the water-dispersibility properties of ordinary lecithin, result in a significantly lower iodine value due to derivitization of ethylenic unsaturated groups with the reactants, alteration of the acid value of this phosphatide mixture, or partial hydrolysis of the long chain fatty acid esters. The chemical modification generally introduces hydrophilic substituents into the fatty acid ester group which in turn renders the lecithin more hydrophilic. Such chemically modified lecithin products typically have an I.V. of less than 50. Illustrative thereof is U.S. Pat. No. 2,629,662 by Julian et al. which discloses peroxide and acid treatment of a 100 I.V. crude soybean lecithin phosphatide to provide a hydrolyzed lecithin having a 35 I.V. In U.S. Pat. No. 3,823,170 by Seaberg and Hayes, the emulsification properties of lecithin are significantly improved by treating an organic acid anhydride treated wet-gum with a base under conditions sufficient to provide a dry phosphatide product of an acid value between about 10 to about 25. Acid and base hydrolysis of crude lecithin reportedly improves its wetting properties. Partial hydrolysis of crude lecithin emulsions with lipase has also been indicated in Danish Pat. No. 101,649 as improving the lecithin emulsification properties.

The extraction of certain antagonistic components from crude lecithin has also been reported as a means to improve upon the emulsification properties of lecithin. Glyceride extraction coupled with choline and cephalin enrichment reportedly improves the water-in-oil emulsifying properties of lecithin. U.S. Pat. No. 3,661,946 by Pardun discloses alcohol extraction provides an enriched choline extract. Similarly, enriched choline lecithins for oil-in-water applications have been reported in U.S. Pat. Nos. 2,849,318 and 2,724,649.

A host of chemical surface active agents are commonly available for enumerable industrial, pharmaceutical, cosmetic, animal feed, food, chemical, etc. applications, including a wide variety of hydrophobic and hydrophilic systems. The chemical composition, the functional properties, emulsifier type (amphoteric, cationic, nonionic, anionic), the HLB, compatibility with various ingredients and combinations, etc. of such surface active agents differ significantly even within the closely related surface active agent classes. Emulsifier combinations (sometimes 3 or more different emulsifiers) are frequently used to achieve the desired emulsification result in many product applications.

Vegetable phosphatide mixtures, especially soy lecithins, are used individually or emulsified in the preparation of fat-containing fodders and foods. They are most effective in the stabilization of water/oil emulsions and less effective in oil/water systems. U.S. Pat. No. 3,208,857 by Howard et al. discloses fluid shortening stabilized with a low-iodine value (e.g., less than 15), hydrogenated vegetable phosphatides and edible high molecular weight surface active adjuncts. Howard et al. mentions a host of potential surface active agents. Oils emulsified in water by a hydrogenated lecithin supplemented with other food grade emulsifiers for use in an aerosol spray release product are reported in U.S. Pat. No. 3,661,605 by Rubin et al. An emulsifier combination of edible phospholipids consisting essentially of phospholipids and mono- and diester mixtures of sorbitol are reported in U.S. Pat. No. 3,560,225 by Wonsiewicz while U.S. Pat. No. 3,360,378 discloses a margarine substitute containing margarine oil and hydrolyzed lecithin in combination with other surface active agents. Similarly Swicklik in U.S. Pat. No. 3,493,387 indicates the inferior cold whipping activity may be improved by an emulsifier system comprised of hydroxylated lecithin, fatty acid monoesters of glycerol and fatty acid esters of 1,2propanediol. A water-dispersible lecithin is reportedly prepared under U.S. Pat. No. 2,193,873 by dissolving the lecithin in ethyl lactate. Industrial Oil and Fat Products (1951) by Alton E. Bailey on pages 283–284 reports the tendency towards the use of lecithin in combination with synthetic agents prepared from a glyceride or fatty acid base. Kirk-Othmer Encyclopedia of Chemical Technology (1967), Vol. 12, reports that commercial types of lecithin may be made by mixing ordinary lecithin with nonionic and anionic surfactants. U.S. Pat. No. 2,499,017 states it is common practice to mix lecithin with polyoxylene derivatives of fatty acids or sorbitan fatty acid esters to provide a composition having acceptable wetting properties when dispersed on powdered materials.

Notwithstanding numerous attempts to correct the oil-in-water emulsification properties of ordinary and high I.V. lecithins by the addition of supplemental surface active agents, the art has been unable to discover an emulsifier system which would readily wet and disperse into cold-water systems with manual mixing to form a homogeneous, stable emulsion thereof. As a result, chemical modification of the lecithin and concomitant reduction of the iodine value thereof has afforded the most effective means of overcoming these prior art difficulties. The inventor wished to achieve a cold-water-dispersible lecithin concentrate containing less than 15% by weight edible surface active agent and an ordinary high-I.V. lecithin which could be manually dispersed into coldwater to form a stable oil-in-water emulsion.

OBJECTS

It is an object of the present invention to provide a cold-water-dispersible, high-I.V. lecithin product which will form stable oil-in-water emulsions.

Another object of the invention is to provide a cold-water-dispersible lecithin concentrate which is compatible and may be used for a broad spectrum of lecithin containing product applications.

An additional object of the invention is to provide an effective and economical process for preparing a cold-water-dispersible lecithin product which contains a high-I.V. lecithin and the method for using the lecithin product thereof.

DISCLOSURE OF THE INVENTION

In the present invention, an unmodified lecithin is homogeneously admixed with a nonionic, polyoxyalkylene-containing emulsifier having an HLB of at least 12 in an amount sufficient to render the homogeneous admixture readily dispersible in cold-water. The nonionic emulsifiers used therein are compositionally characterized as containing at least one terminal fatty hydrocarbyl moiety, at least one polyalkylene oxide moiety with an aggregate total of at least 5 oxyalkylene units and at least one terminal hydroxy moiety. The terminal hydroxy moiety may be a terminal group of the polyoxyalkylene group or may be directly attached to a carbon which is not a part of either the polyoxyalkylene or fatty chain moiety. The present surface active agents are miscible in both water and lecithin at a 10% by weight concentration and 20° C. Nonionic emulsifiers having such characteristics include the polyoxyalkylene derivatives of partial fatty acid esters and hexitol anhydrides, the polyoxyalkylene derivatives of fatty glycerides which contain at least one fatty acid group, mixtures thereof and the like.

Illustrative polyoxyalkylene derivatives of the partial fatty acid esters and hexitol anhydrides including nonionic emulsifiers represented by the following structural formula I:

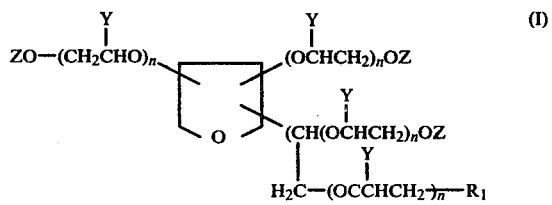

(I)

wherein Z and Y represent either hydrogen or methyl, n represents the average number of repeating oxyalkylene units with the cumulative total of n being a value of at least 5 and $R_1$ represents fatty chain of at least 12 carbon atoms. Most typical polyoxyalkylene units include polyoxyethylene (POE) and polyoxypropylene (POP), mixtures thereof and the like. Representative polyoxyalkylene derivatives of partial fatty acid esters and hexitol anhydrides include POE (20) sorbitan monostearate, POP (200) sorbitan monostearate, POE (20) sorbitan tristearate, POE (10) sorbitan distearate, POE (15) mannitan monopalmitate, POE (10) mannitan dimyristate, POE (20) sorbitan dioleate, POE (20) sorbitan monooleate, POE (20) sorbitan trioleate, POE (20) galactitan monostearate, POE (20) galactitan dioleate and POE (30) sorbitan monostearate, POE (20) monolaurate, POE (20) sorbitan monopalmitate, POE (5) sorbitan monooleate, mixtures thereof and the like.

Another chemical class of polyoxyalkylene containing nonionic emulsifiers which are particularly effective in the preparation of the cold-water-dispersible lecithins are the polyoxyalkylene derivatives of partial fatty acid glycerides. This class includes the polyoxyalkylene derivative of mono- and diglycerides such as depicted by Formula II:

$$CH_2(R_2)CH(R_3)CH_2(R_4) \qquad (II)$$

wherein at least two of the ($R_2$), ($R_3$) and ($R_4$) members are selected from the group consisting of a fatty acid ester having at least 12 carbon atoms and a polyoxyalkylene moiety represented by the formula:

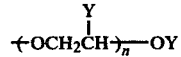

in which n represents an average number of repeating oxyalkylene units, Y is either hydrogen or methyl and the remaining $R_1$, $R_2$ or $R_3$ member of the Formula II composition is either hydroxyl, a polyoxyalkylene moiety or a fatty acid ester.

The combination of the polyoxyalkylene derivatives of mono- and diglycerides and lecithin, in the concentrated form, is at least about two times more effective than the polyoxyalkylene partial fatty acid esters of hexitol anhydrides. The polyoxyethylene mono- and diglyceride combination disperses much more readily in water and provides a more uniform and stable emulsion. The ethoxylated mono- and diglycerides having a saponification number ranging from 65–75, acid number 0–2, hydroxyl number 65–80 and an oxyethylene content 60.5–65 percent of the compositions molecular weight are particularly useful for food applications.

The aforementioned nonionic polyoxyalkylene derivatives of partial fatty acid esters and hexitol and/or polyoxyalkylene derivatives of mono- and diglyceride when homogeneously admixed together with a lecithin having an iodine value of at least 75 will form a concentrate that readily and homogeneously disperses into cold water (e.g., 10° C.) at a concentration in excess of 10% by weight. The concentrate neither requires high shear conditions (mechanical) nor high temperature for homogeneous dispersal into cold water. Unlike chemically modified lecithins, which characteristically have an I.V. of less than 35, the water-insoluble lecithins are characterized as having an I.V. of at least 75 and most typically between about 90 to about 130. Homogeneous aqueous dispersions prepared from the lecithin concentrates remain remarkably stable without separating after storage at 20° C. for 30 days.

The nonionic emulsifier concentration needed to render the lecithin cold-water-dispersible and stable will depend upon the particular emulsifier which is used therein. The emulsifier concentration should be sufficient to stabilize the aqueous emulsion and impart cold-water-dispersibility properties to the lecithin concentrate. In general, the nonionic emulsifier concentration will generally range from about 5 to about 15 parts by weight for each 100 parts by weight lecithin (d.s.b.).

The type of fatty acid ester or fatty chain, the average number of polyoxyalkylene units and the HLB of the surface active agent affects the cold-water-dispersibility and stability of the lecithin concentrate. Advantageously the surface active agent molecule contains an average of at least 10 polyoxyalkylene units (e.g., about 10 to about 35) and preferably at least 15 units with about 20 units being most preferred. Fatty chains or fatty acid substrate containing from about 12 to about 22 carbon atoms and most preferably 18 carbon atoms have been found particularly effective. The saturated fatty alkyl or fatty acid ester are more effective emulsifiers for the lecithin concentrate than the unsaturates. Similarly, the nonionic surface active agents having an HLB of at least 10, and preferably within the range of about 12 to about 18, are more effective than those of a lesser HLB.

Although the invention generally applies to phosphatides of a seed origin, it particulary applies to lecithins derived from phosphatide-containing oil of leguminous seeds (especially soybeans) including phosphatides obtained by oil extraction with hydrocarbon solvent such as hexane (e.g., see U.S. Pat. No. 2,782,216 by Hayes et al.) or hexane/alcohol solvent systems (e.g., see U.S. Pat. No. 3,734,901 by L. P. Hayes et al.) as well as other solvent systems and means for obtaining vegetable phosphatides therefrom. The lecithin or fractions thereof are generally characterized as being insoluble or non-dispersible in cold water at 10% by weight concentration and 20° C. In contrast to most chemically modified lecithins which have been derivatized to an I.V. less than 35 to increase their water-dispersibility, the lecithins employed herein have an I.V. of at least 75.

The lecithin concentrate of this invention may be prepared by homogeneously blending the lecithin and surface active agents together. In order to achieve uniform distribution of the surface active agents throughout the lecithin concentrate, it is advantageous to heat the lecithin to a temperature in excess of 30° C. and preferably above 40° C. Blending or mixing temperatures ranging from about 40° C. up to about 100° C., particularly from 50° C. to about 70° C., will facilitate homogeneity of the concentrate blend. Lecithin concentrates containing from about 6 to about 12 parts surface active agent for each 100 parts by weight lecithin provide excellent cold-water wetting and dispersibility, and form stable emulsions thereof upon reconstitution in water. Homogeneous blends comprising from about 8 to about 10 parts by weight of a polyoxyalkylene propylene glycol ester containing about 20 oxyalkylene units and having at least one fatty acid portion in said ester of about 16 to about 18 carbon atoms (preferably the saturated fatty acid chain) for each 100 parts by weight lecithin provide a lecithin product having exceptional rapid wetting and cold-water-dispersibility properties and form highly stable oil-in-water emulsions.

The homogeneous blend of the lecithin and surface active agent in the concentrate form may be separately used for a wide variety of applications. The concentrate may be dry-blended with other dry ingredients (including solids and liquids) to provide a dry product wherein the lecithin component upon reconstitution with water or a water-containing media will readily disperse to form stable emulsions thereof. It may be combined with other hydrophilic or hydrophobic diluents or carriers such as lipids, carbohydrates, proteinaceous materials, etc. If desired, it may be used in conjunction with solid proteinaceous carriers such as soy flours, concentrated dry milk solids, animal, fish, poultry, yeast, etc. The lecithin and surface active agent may also be used as a lubricant and tenderizing, texturizing agent in the manufacture of textured vegetable proteins (e.g., meat extenders, or substitutes, etc.) including soy protein concentrate or isolates which are prone to form tough extrudates. The concentrates, when used alone or emulsified into water, are effective release agents for a wide variety of food and industrial applications. They may be coated or sprayed upon culinary apparatus or utensils to provide an effective release agent for a wide variety of cooked food products. The lecithin concentrates may also be utilized as a carrier and emulsifying agent for lipophiles such as artificial and natural flavoring and coloring agents, vitamins, etc. for use in aqueous systems or dried products thereof. Other conventional additives such as microbides, antioxidants, gums, starches, etc. may be formulated in the lecithin/surface active agent combination provided such additions do not destroy the cold-water-dispersible properties of the combination.

The following example is illustrative of the invention.

EXAMPLE

A commercial grade of a bleached fluid lecithin (5204 parts, STA-SOL BF-, manufactured and distributed by A. E. Staley Manufacturing Company, Decatur, Illinois, United States of America, characterized as having an A.I. of 63, 75 poise viscosity, I.V. of 95, Lovibond color 5Y-0.8R, benzene insoluble of 0.02% by weight) was blended with 452 parts ethoxylated mono- and diglyceride nonionic emulsifier (SANTELLE EOM, manufactured and distributed by Durkee Foods Group/SCM Corporation, Cleveland, Ohio, HLB of 13.1) at 60° C. and a moderate speed (about 350–400 rpm) in a Model NM2 Lightnin' Mixer equipped with a six inch diameter, 3-bladed agitator. The homogeneous blend was ambiently cooled to room temperature (23° C.). The resultant concentrate had the following characteristics: an A.I. of 54, Lovibond color of 5.0Y–0.8R, 69.7 poise viscosity and benzene insoluble of 0.00 versus the 0.02% benzene insoluble for fluid lecithin raw material. When added to water and manually shaken in concentration up to 20% concentrate at room temperature, a white milky emulsion was readily formed. This emulsion could be readily formed manually by slow stirring into large volumes of water even at lower temperatures (e.g., 5° C.) over a broad conentration range (e.g., up to 30% or more). The emulsion (at 10% by weight concentration) was stable when centrifuged for 15 minutes at 1200×g. In contrast, the control (lecithin by itself) rapidly separated upon centrifugation. In excess of 20% by weight concentrate, an emulsion could not be formed from the control whereas a thin viscosity emulsion was obtained from the concentrate. Homogeneous emulsions, ranging between 0.1–20% by weight concentrate in water, uniformly dispersed into water at 23° C. and neither separated nor evidenced any change in its opaque and white color upon quiescent storage for 30 days at 23° C. The control did not form an emulsion at 23° C. even at low concentrations. Temperatures in excess of 48° C. and vigorous mechanical mixing were required to place the control in an emulsified form. Emulsions formed with the concentrate at high concentrations (20%) were a thick, pituitous, gel-like mass.

Comparative studies were conducted upon BF lecithin obtained from the wet gums of hexane/ethanol extracted crude oils, a hexane extracted lecithin, a polyoxyethylene sorbitan monostearate-lecithin concentrate blend, sorbitan monostearate-lecithin concentrate blend, and lecithin-ethoxylated mono- and diglyceride concentrate at various concentrations in water as shown in the Table.

achieved. Upon reconstitution with water, the emulsifier readily disperses the lecithin in a colloidal form. It appears as though the emulsifier system of the concentrate effectively places the lecithin in an extremely small and uniform particle size (i.e., small and uniform micelles) which accounts for its rapid cold-water-dispersibility and its ability to form highly stable emulsions. Another unexpected result relates to the viscosity of

TABLE

| LECITHIN | % POLYSORBATE 60 | % SORBITAN MONOSTEARATE | % SANTELLA EOM | % CONCENTRATE ADDED TO H$_2$O | % TRANSMISSION |
|---|---|---|---|---|---|
| Bleached Fluid (Hexane) | 0 | 0 | 0 | 0.1 | 90 |
| Bleached Fluid (Hexane/Alcohol) | 0 | 0 | 0 | 0.1 | 70 |
| Bleached Fluid (Hexane/Alcohol) | 0 | 0 | 8 | 0.1 | 12  19  23 |
| Bleached Fluid (Hexane/Alcohol) | 0 | 8 | 0 | 0.1 | 85 |
| Bleached Fluid (Hexane/Alcohol | 8 | 0 | 0 | 0.1 | 20  33  28 |
| Bleached Fluid (Hexane) | 0 | 0 | 0 | 0.5 | 78 |
| Bleached Fluid (Hexane/Alcohol) | 0 | 0 | 0 | 0.5 | 47 |
| Bleached Fluid (Hexane/Alcohol) | 0 | 0 | 8 | 0.5 | 3 |
| Bleached Fluid (Hexane/Alcohol) | 0 | 8 | 0 | 0.5 | 80 |
| Bleached Fluid (Hexane/Alcohol) | 8 | 0 | 0 | 0.5 | 2 |
| Bleached Fluid (Hexane) | 0 | 0 | 0 | 1.0 | 85 |
| Bleached Fluid (Hexane/Alcohol) | 0 | 0 | 0 | 1.0 | 30 |
| Bleached Fluid (Hexane/Alcohol) | 0 | 0 | 8 | 1.0 | 1 |
| Bleached Fluid (Hexane/Alcohol) | 0 | 8 | 0 | 1.0 | 78 |
| Bleached Fluid (Hexane/Alcohol) | 8 | 0 | 0 | 1.0 | 2 |
| Bleached Fluid (Hexane) | 0 | 0 | 0 | 10.0 | 20 |
| Bleached Fluid (Hexane/Alcohol) | 0 | 0 | 0 | 10.0 | 2 |
| Bleached Fluid (Hexane/Alcohol) | 0 | 0 | 8 | 10.0 | 0 |
| Bleached Fluid (Hexane/Alcohol) | 0 | 8 | 0 | 10.0 | 15 |
| Bleached Fluid (Hexane/Alcohol) | 8 | 0 | 0 | 10.0 | 0 |
| Bleached Fluid (Hexane) | 0 | 0 | 0 | 20.0 | 21 |
| Bleached Fluid (Hexane/Alcohol) | 0 | 0 | 0 | 20.0 | 3 |
| Bleached Fluid (Hexane/Alcohol) | 0 | 0 | 8 | 20.0 | 0 |
| Bleached Fluid (Hexane/Alcohol) | 0 | 8 | 0 | 20.0 | 3.3 |
| Bleached Fluid (Hexane/Alcohol) | 8 | 0 | 0 | 20.0 | 0 |

The emulsions used in the test were prepared by weighing the appropriate amount of lecithin and water to a total of 100 gms. into a 250 ml. Erlenmeyer flask. The flasks were then placed on a Burrell wrist action shaker set at slow speed for 2 minutes duration. The solutions were then transferred to a curvette and then percent transmission determined at 540 nm using a B&L Spectronic 20 spectrophotometer. A low percent transmission reflects a more uniform and stable emulsion. The lecithin/polysorbate 60 concentrates and the lecithin/ethoxylated mono- and diglyceride concentrates formed a more dispersed emulsion than the hexane extracted, hexane/alcohol extracted or sorbitan monostearate-lecithin blend. The rate of emulsion formation was faster for the lecithin/ethoxylated mono- and diglyceride concentrate (@0.04% concentration) than the lecithin/polysorbate 60 concentrate (@0.04%) as evidenced after two minutes shaking by a respective percent transmission of 27% and 66%.

The concentrates of this invention, when reconstituted and emulsified in water, form a more uniform and stable emulsion than those directly prepared from water, emulsifier and lecithin mixtures. In contrast to the concentrates herein which readily disperse in water with moderate mixing at low temperatures, elevated temperatures (e.g., 50° C.) and vigorous mixing conditions are generally required to effectively emulsify a comparable water, emulsifier and lecithin mixture. The polyoxyethylene mono- and diglycerides are miscible with water and the lecithin at the emulsifier levels used herein to prepare the concentrates. By homogeneously blending the lecithin and emulsifier together at elevated temperatures, homogeneous distribution of the emulsifier throughout the lecithin in the concentrate is emulsions prepared from the concentrates. Unlike lecithin by itself which typically forms a slimy, heterogeneous dispersion upon reconstitution and emulsification at elevated concentrations (e.g., 10%), the emulsified concentrates of this invention at concentrations of 30% or higher will initially form a uniform, low-viscosity, milk-like emulsions. Although these highly concentrated emulsions will tend to thicken upon standing (e.g., after 2-3 hours), the thickened emulsions remain stable over prolonged storage. The concentrates will immediately form emulsions (e.g., less than 10 seconds and typically less than five seconds) upon mixing with water at 45° C. or less with no apparent rate of dispersion differences at the cooler mixing temperatures (e.g., 35° C. or less).

What is claimed is:

1. A lecithin concentrate adapted to readily disperse into water at 10° C. and 10% by weight concentration and form a stable emulsion therewith, said concentrate comprising lecithin characterized as having an I.V. of at least 75 and at least one nonionic emulsifier having an HLB of at least 12 and selected from the group consisting of polyoxyalkylene monoglyceride, polyoxyalkylene diglyceride and the polyoxyethylene derivatives of partial fatty acid esters and hexitol anhydride, with said emulsifier being homogeneously dispersed throughout said concentrate at a level ranging from about 5 to about 15 parts by weight nonionic emulsifier for each 100 parts by weight lecithin.

2. The concentrate according to claim 1 wherein the concentrate contains from about 6 to about 12 parts by weight nonionic emulsifier represented by the formula:

wherein at least two of the ($R_2$), ($R_3$) and ($R_4$) members are selected from the group consisting of a fatty acid ester having at least 12 carbon atoms and a polyoxyalkylene moiety represented by the formula:

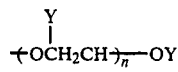

in which n represents an average number of repeating oxyalkylene units, Y is either hydrogen or methyl and the remaining ($R_1$), ($R_2$) and ($R_3$) member in the formula is either hydroxyl, a polyoxyalkylene moiety or a fatty acid ester.

3. The concentration according to claim 2 wherein Y represents a hydroxyl group, n represents an average number ranging from about 15 to 35 oxyethylene units and the I.V. of lecithin ranges from about 90 to about 130.

4. The concentrate according to claim 3 wherein the nonionic emulsifier comprises a mixture of polyoxyethylene monoglycerides and polyoxyethylene diglycerides which contain from 60 to about 65 percent by weight polyoxyethylene based on the molecular weight of the nonionic emulsifier.

5. The concentrate according to claim 4 wherein the concentrate contains from about 8 to about 10 parts by weight nonionic emulsifier for each 100 parts by weight lecithin and the fatty acid ester consists essentially of saturated fatty acid esters containing from 16 to 18 carbon atoms inclusive.

6. The method of preparing a cold-water-dispersible, fluid lecithin concentrate which readily disperses into cold water and forms a stable emulsion therewith, said method comprising blending from about 5 to about 15 parts by weight of at least one nonionic emulsifier selected from the group consisting of polyoxyalkylene monoglyceride, polyoxyalkylene diglyceride and the polyoxyalkylene derivatives of partial fatty acid esters and hexitol anhydrides with 100 parts by weight lecithin having an I.V. of at least 75, with said blending being conducted at an elevated temperature and under mixing conditions sufficient to form a homogeneous concentrate of said emulsifier and said lecithin.

7. The method according to claim 6 wherein the nonionic emulsifier consists essentially of an emulsifier represented by the formula:

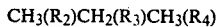

wherein at least two of the ($R_2$), ($R_3$) and ($R_4$) members are selected from the group consisting of a fatty acid ester having at least 12 carbon atoms and a polyoxyalkylene moiety represented by the formula:

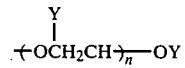

in which n represents an average number of repeating oxyalkylene units, Y is either hydrogen or methyl and the remaining ($R_1$), ($R_2$) and ($R_3$) member in the formula is either hydroxyl, a polyoxyalkylene moiety or a fatty acid ester; and the amount of emulsifier in the concentrate ranges from about 6 to about 12 parts by weight.

8. The method according to claim 7 wherein Y represents a hydroxyl group, n represents an average number ranging from about 15 to 35 oxyalkylene units and the I.V. of lecithin ranges from about 90 to about 130 and the lecithin and emulsifier are homogeneously blended together at a temperature between about 40° C. to 100° C.

9. The method according to claim 7 wherein the nonionic emulsifier comprises a blend of polyoxyethylene monoglyceride and polyoxyethylene diglyceride.

10. The method according to claim 9 wherein the concentrate contains from about 8 to about 10 parts by weight nonionic emulsifier for each 100 parts by weight lecithin and the fatty acid esters consist essentially of saturated fatty acid ester containing from 16 to 18 carbon atoms inclusive.

11. The method according to claim 10 wherein the emulsifier and lecithin are blended together at a temperature ranging from about 50° C. to about 70° C. for a period of time and under mixing conditions sufficient to provide a homogeneous concentrate characterized as readily dispersing in 5° C. water at a concentration of at least 10% by weight to form a stable lecithin in water emulsion.

12. In a method for forming an aqueous media which contains a lecithin of an I.V. of at least 75, homogeneously dispersed and emulsified in said aqueous media, the improvement which comprises adding to an aqueous media a lecithin concentrate comprised of a homogeneous blend of about 5 to about 15 parts by weight nonionic emulsifier, having an HLB of at least 12, and 100 parts by weight lecithin which has an I.V. of at least 75; with said nonionic emulsifier being at least one member selected from the group consisting of polyoxyalkylene monoglyceride, polyoxyalkylene diglyceride and polyoxyethylene derivative of partial fatty acid ester and hexitol anhydride.

13. The method according to claim 12 wherein the concentrate is emulsified in an aqueous media at a temperature of 30° C. or less.

14. The method according to claim 12 wherein the nonionic emulsifier consists essentially of an emulsifier represented by the formula:

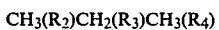

wherein at least two of the ($R_2$), ($R_3$) and ($R_4$) members are selected the group consisting of a fatty acid ester having at least 12 carbon atoms and a polyoxyalkylene moiety represented by the formula:

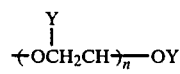

in which n represents an average number of repeating oxyalkylene units, Y is hydrogen and the remaining ($R_1$), ($R_2$) and ($R_3$) member in the formula is either hydroxyl, a polyoxyalkylene moiety or a fatty acid ester; and the amount of emulsifier in the concentrate ranges from about 6 to about 12 parts by weight.

15. The method according to claim 14 wherein n represents an average number ranging from about 15 to 35 oxyalkylene units and the I.V. of lecithin ranges from about 90 to about 130.

16. The method according to claim 15 wherein the nonionic emulsifier comprises a blend of polyoxyethylene monoglyceride and polyoxyethylene diglyceride.

17. The method according to claim 16 wherein the concentrate contains from about 8 to about 10 parts by weight nonionic emulsifier for each 100 parts by weight lecithin and the fatty acid esters consist essentially of saturated fatty acid esters containing from 16 to 18 carbon atoms inclusive.

18. The method according to claim 16 wherein the concentrate is characterized as readily dispersing in 5° C. water at a concentration of at least 10% by weight.

* * * * *

UNITED STATES PATENT AND TRADEMARK OFFICE
CERTIFICATE OF CORRECTION

PATENT NO. : 4,200,551
DATED : April 29, 1980
INVENTOR(S) : Frank T. Orthoefer

It is certified that error appears in the above-identified patent and that said Letters Patent are hereby corrected as shown below:

Column 2, line 56, for "2,499,017" read ---3,499,017---
Column 3, line 7, for "coldwater" read ---cold-water---
Column 3, line 68, for "(200 sorbitan" read ---(20) sorbitan---
Column 6, line 51, for "conentration" read ---concentration---

Claim 2, second formula for "$(\text{OCH}_2\text{CH})_n\text{-OY}$" with Y above, read --- $(\text{OCH}_2\overset{Y}{\text{CH}})_n\text{OY}$ ---

Claim 7, first formula for "$\text{CH}_3(\text{R}_2)\text{CH}_2(\text{R}_3)\text{CH}_3(\text{R}_4)$" read
---$\text{CH}_2(\text{R}_2)\text{CH}(\text{R}_3)\text{CH}_2(\text{R}_4)$---

Claim 7, second formula, for "$(\overset{Y}{\text{OCH}_2\text{CH}})_n\text{OY}$" read --- $(\text{OCH}_2\overset{Y}{\text{CH}})_n\text{OY}$ Claim 14, first formula, for  "$\text{CH}_3(\text{R}_2)\text{CH}_2(\text{R}_3)\text{CH}_3(\text{R}_4)$"

read ---$\text{CH}_2(\text{R}_2)\text{CH}(\text{R}_3)\text{CH}_2(\text{R}_4)$---

Claim 14, second formula, for "$(\overset{Y}{\text{OCH}_2\text{CH}})_n\text{OY}$" read --- $(\text{OCH}_2\overset{Y}{\text{CH}})_n\text{OY}$ ---

Signed and Sealed this

Ninth Day of June 1981

[SEAL]

Attest:

RENE D. TEGTMEYER

*Attesting Officer*    *Acting Commissioner of Patents and Trademarks*